United States Patent [19]

Adamczyk et al.

[11] Patent Number: 5,607,529
[45] Date of Patent: Mar. 4, 1997

[54] INSULATED FLEXIBLE AIR DUCT AND THE PROCESS FOR MANUFACTURING THE SAME

[76] Inventors: Eric J. Adamczyk, 11407 W. Roxbury Ave., Littleton, Colo. 80127; Don A. Forte, 29840 Denali La., Evergreen, Colo. 80439

[21] Appl. No.: 389,835

[22] Filed: Feb. 15, 1995

[51] Int. Cl.⁶ .......................... B29C 53/64; B29C 53/78; B65H 81/00
[52] U.S. Cl. .......................... 156/143; 138/149; 156/188; 156/190; 156/195; 156/429; 156/446
[58] Field of Search ..................................... 156/143, 144, 156/172, 188, 190, 195, 433, 446, 429; 138/149, 150, 154, 129

[56] References Cited

U.S. PATENT DOCUMENTS

| | | | |
|---|---|---|---|
| 2,037,043 | 4/1936 | Postlewaite | 156/143 |
| 2,343,747 | 3/1944 | Chernack | 156/144 |
| 2,941,911 | 6/1960 | Kumnick | 156/188 |
| 3,216,459 | 11/1965 | Schroeder et al. | |
| 3,616,123 | 10/1971 | Reynolds, Jr. et al. | |
| 3,817,804 | 6/1974 | Helmick et al. | 156/144 |
| 3,857,590 | 12/1974 | Meeker | |
| 4,324,607 | 4/1982 | Dugger | 156/446 |
| 4,410,014 | 10/1983 | Smith | |
| 4,459,168 | 7/1984 | Anselm | 156/195 |
| 4,553,023 | 11/1985 | Jameson | 138/33 |
| 5,205,889 | 4/1993 | Cioffi | 156/188 |

FOREIGN PATENT DOCUMENTS 0005278  11/1979  European Pat. Off. ............... 156/143

*Primary Examiner*—Daniel Stemmer
*Attorney, Agent, or Firm*—Cornelius P. Quinn

[57] ABSTRACT

An insulated flexible air duct comprises a flexible cylindrical core; a layer of fibrous insulation blanket surrounding the flexible core and comprising a strip of fibrous blanket helically wrapped about the flexible core with lateral portions of successive convolutions of the insulation strip overlapping so that the air duct can be flexed without forming a gap between the successive convolutions of the insulation strip; and a vapor barrier jacket comprising a strip of plastic jacket film helically wrapped about the layer of fibrous insulation. The insulated, flexible air duct is formed in one continuous operation. As the flexible core is formed it is rotated about its longitudinal axis. The rotating core is fed in an axial direction through an insulation wrapping station and a vapor barrier jacket wrapping station where the fibrous insulation strip is wrapped about the core and the vapor barrier strip is helically wrapped about the insulation to form the air duct.

6 Claims, 3 Drawing Sheets

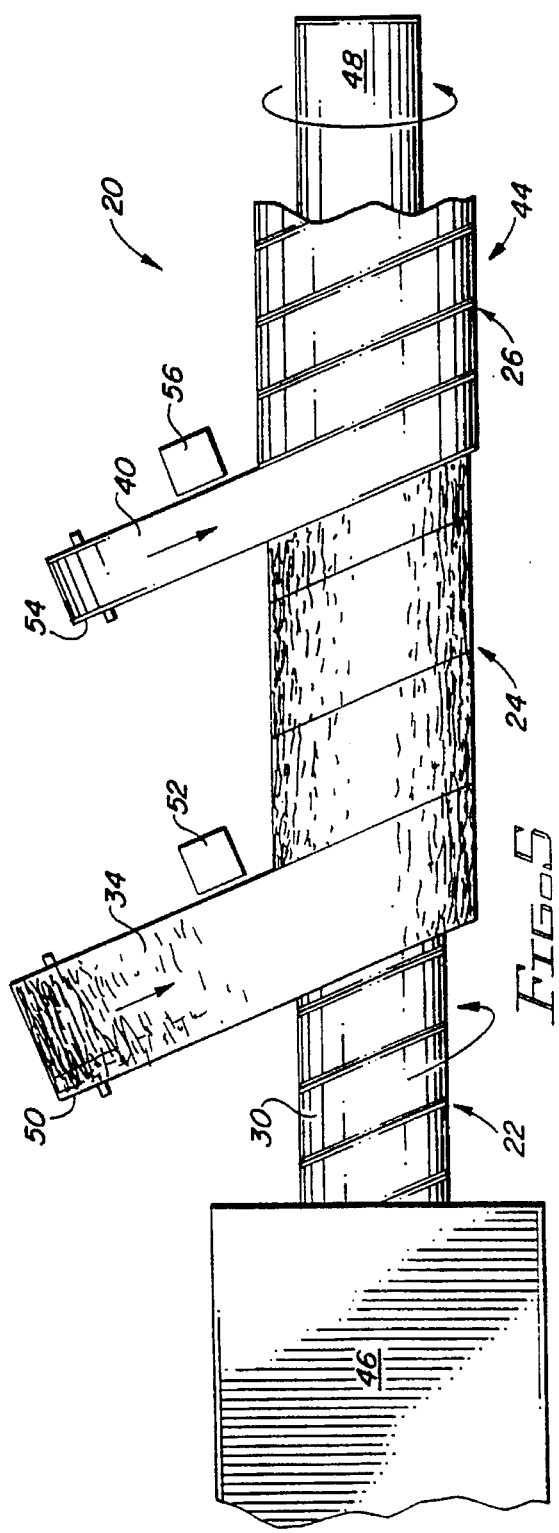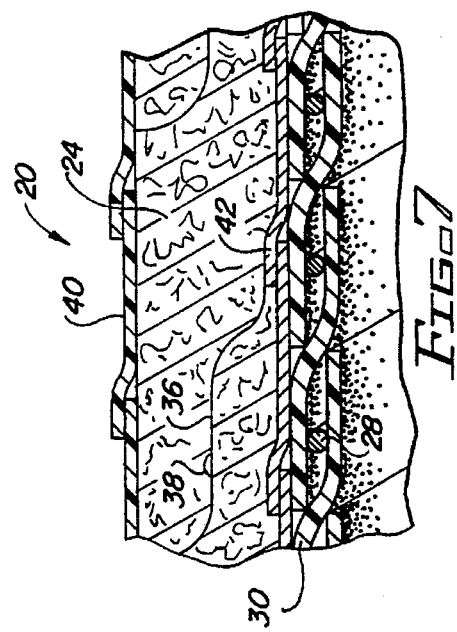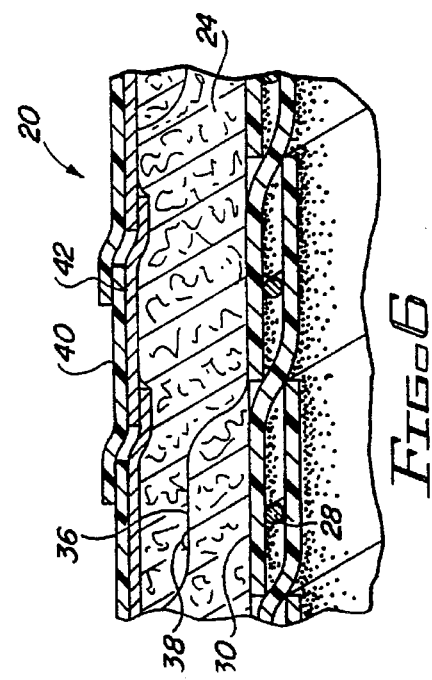

INSULATED FLEXIBLE AIR DUCT AND THE PROCESS FOR MANUFACTURING THE SAME

BACKGROUND OF THE INVENTION

The present invention is directed to insulated air ducts and, in particular, to flexible insulated air ducts wherein the fibrous insulation is helically wrapped about the flexible core of the air duct and the air duct is formed in one continuous operation.

Insulated, flexible air ducts are in common use in commercial, industrial and residential heating, ventilating and air conditioning systems. These air ducts typically comprise a cylindrical flexible core having a wire helix with spaced convolutions enveloped in a plastic film. The flexible core is surrounded by a layer of fibrous insulation, such as glass fiber insulation and a vapor barrier jacket or sleeve of plastic film envelops the fibrous insulation.

Under present practice, flexible, cylindrical, tubular cores (typically in pre-cut twenty-five foot sections), rolls of fibrous insulation blanket and jacketing material are shipped separately to a fabrication shop where the flexible, insulated duct is assembled in sections (typically twenty-five feet in length), packaged and forwarded to either distributors or heating, ventilating and air conditioning contractors. At the fabrication shop, the rolls of fibrous insulation blanket, which have been sized to widths corresponding to the circumferential dimensions of the various diameter tubular cores being insulated and jacketed to form the flexible insulated air ducts, are hand or mechanically wrapped about the tubular cores forming one longitudinally extending seam along the length of each section of air duct as shown in U.S. Pat. No. 4,410,014; issued Oct. 18, 1983; to Owens-Corning Fiberglas; and entitled "Flexible Insulated Air Duct". At the time of assembly, a jacket of vapor barrier material is placed over the layer of fibrous insulation to complete the fabrication of the air duct section. If required, a layer of scrim material can also be interposed between the layer of fibrous insulation and the tubular core or between the layer of fibrous insulation and the jacket for additional strength.

The current practice of shipping the separate components of the flexible, insulated air duct to a fabrication shop and assembling the flexible, insulated air duct at the fabrication shop is labor intensive, requires the maintenance of an inventory of separate widths of insulation and jacketing for each different duct diameter, and is relatively costly. Thus, there is a need to reduce the separate packaging, shipping, handling and inventory costs involved in the present practice of assembling flexible insulated air duct at a fabrication shop and the labor intensive assembly procedures currently used by such fabrication shops.

SUMMARY OF THE INVENTION

The present invention is directed to a continuous process for manufacturing insulated, flexible air ducts and air connectors (hereinafter referred to as "air ducts") and the flexible insulated air ducts produced thereby which solves the problems discussed above in connection with the current insulated, flexible air duct assembly practices. Ideally, the insulated, flexible air duct manufacturing operation would be located immediately adjacent the "cold end" or downstream end of the fibrous insulation blanket manufacturing line and would permit the fabrication of insulated, flexible air ducts of various lengths and diameters to accommodate the heating, ventilating and air conditioning contractor's requirements.

The continuous process for manufacturing the insulated, flexible air ducts of the present invention includes using cylindrical, flexible tubular cores like the cylindrical, flexible tubular cores currently used in insulated flexible air ducts. Preferably, the cylindrical, flexible tubular cores are manufactured adjacent the cold end of the fibrous insulation blanket production line by the continuous process currently used to manufacture such tubular cores wherein a rotating tubular core comprising a spirally or helically wound reinforcing wire enveloped within a plastic helically wrapped film exits the core fabricating machine as a continuous length of cylindrical, flexible tubular core.

The continuous, rotating cylindrical, flexible tubular core supported on a cylindrical mandrel extending from the core fabricating machine is fed axially into an insulating station. In the insulating station, a strip of fibrous insulation blanket is fed either from a roll or continuously from the cold end of a fiberglass blanket manufacturing machine and spirally or helically wrapped about the rotating tubular core to form a layer of insulation surrounding the flexible tubular core. Lateral portions of successive convolutions of the strip of fibrous insulation blanket are overlapped so that gaps do not appear between the successive convolutions of the fibrous insulation blanket when the insulated, flexible air duct is flexed. In addition, an adhesive can be applied to the overlapping portions of the successive convolutions of fibrous insulation blanket to bond these lateral portions together and further assure that gaps are not created when the insulated, flexible air duct is flexed.

The insulated, rotating flexible tubular core, still on the mandrel, is now fed axially into a jacketing station. In the jacketing station, a plastic or metallized plastic, strip of vapor barrier material is fed from a roll or from a jacket material production station and spirally or helically wrapped about the insulated, flexible tubular core to form a vapor barrier jacket on the insulated, flexible tubular core. Overlapping lateral portions of adjacent convolutions of the strip of vapor barrier material are heat sealed or otherwise bonded together to complete the formation of the insulated flexible air duct.

The insulated, flexible air duct is then fed axially into a cutting station where the completed air duct is cut to desired lengths for packaging and inventory or shipment to a distributor or a heating, ventilating and air conditioning contractor.

Should the insulated, flexible air duct require further reinforcement, a scrim wrapping station can be located intermediate the core fabricating machine and the insulating station or intermediate the insulating station and the jacketing station. In the scrim wrapping station, a strip of scrim material would be spirally or helically wrapped about the tubular core or the fibrous insulation layer of the air duct.

By spirally or helically wrapping the strip of fibrous insulation blanket about the tubular core of the air duct, one or two widths of insulation strips, specifically selected for the width of the insulation roll from which the strips are formed to eliminate any scrap, can be used to insulate air ducts of various diameters. Unlike current fabricating procedures, such as shown in the '014 patent referred to above, the width of the fibrous insulation strip does not have to be changed for each of the different diameter air ducts. Instead, one or maybe two separate widths of insulation strips can be used to insulation the entire diameter range of air ducts.

By helically wrapping the insulation blanket, the jacketing material and the scrim material, if used, about the tubular core in an automated process to form the insulated flexible air duct, the labor intensive fabrication procedures currently used to fabricate insulated, flexible air ducts can be minimized and fully fabricated sections of insulated flexible air duct of the desired lengths and diameters can be shipped to the heating, ventilating and air conditioning distributor or contractor for inventory or installation. Thus, the present invention is a more economical and efficient manufacturing process which solves many of the problems enumerated above in connection with current insulated flexible air duct fabricating procedures.

BRIEF DESCRIPTION OF THE DRAWINGS

FIG. 5 is a schematic plan view of the insulated, flexible air duct manufacturing apparatus of the present invention.

FIG. 6 is a longitudinal detail, similar to FIG. 3, through a portion of a second embodiment of the insulated flexible air duct of the present invention which has a scrim material reinforcement layer intermediate the insulation layer and the jacket of the air duct.

FIG. 7 is a longitudinal detail, similar to FIG. 3, through a portion of a third embodiment of the insulated flexible air duct of the present invention which has a scrim material reinforcement layer intermediate the tubular core and the insulation layer.

DETAILED DESCRIPTION OF THE PREFERRED EMBODIMENTS

Figure 1:
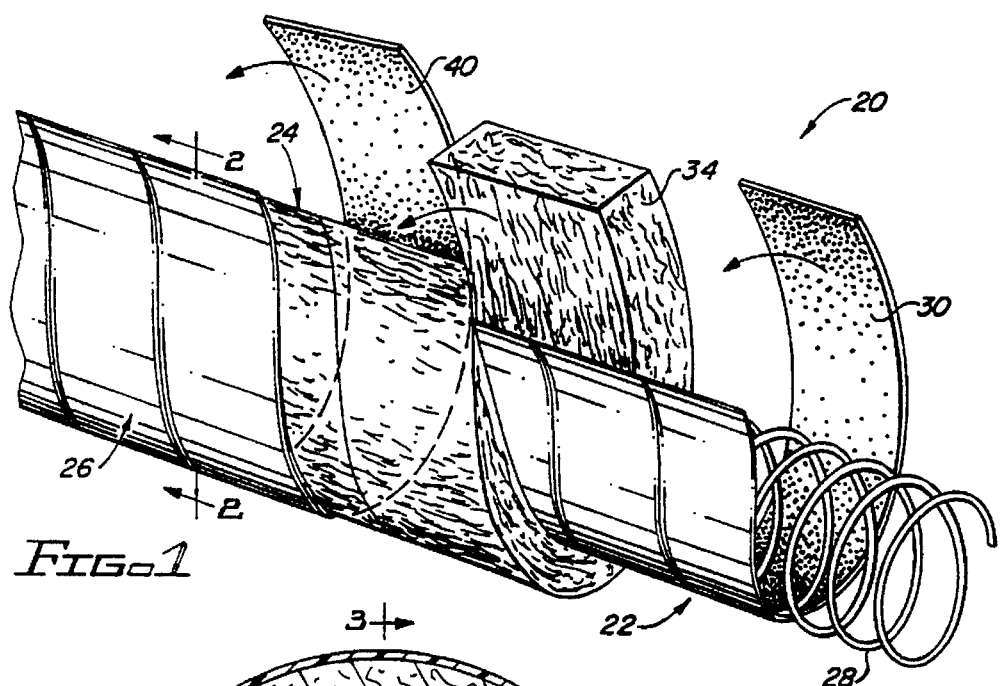
FIG. 1 is a perspective view of the insulated, flexible air duct of the present invention with portions stripped away to better show the structure of the air duct.
Figure 2:
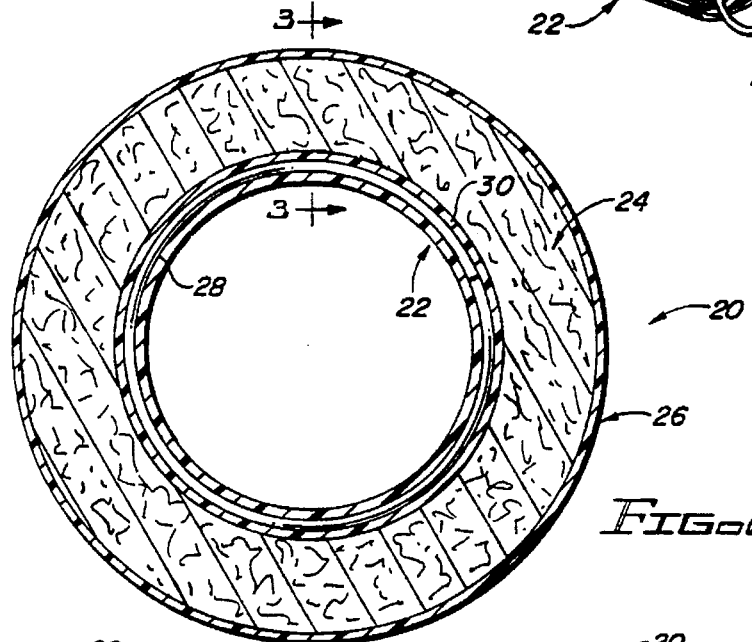
FIG. 2 is a transverse section through the insulated, flexible air duct of the present invention and taken along lines 2—2 of FIG. 1.
Figure 3:
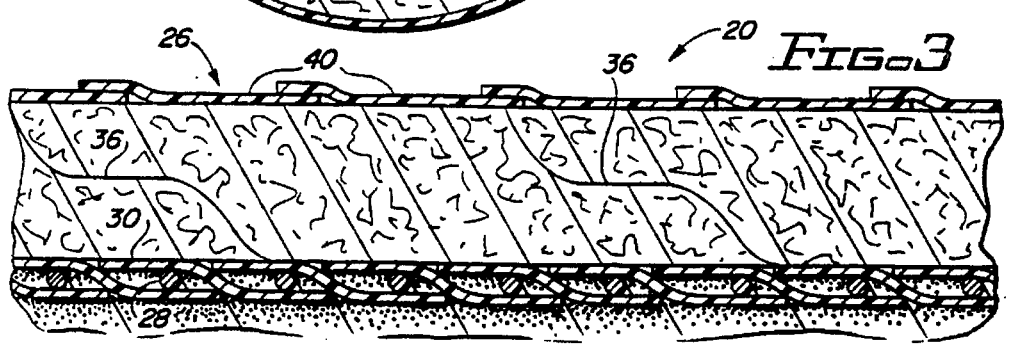
FIG. 3 is a longitudinal detail through a portion of the insulated flexible air duct taken along lines 3—3 of FIG. 2.

As shown in FIGS. 1, 2 and 3, the insulated flexible air duct 20 of the present invention comprises a flexible, cylindrical tubular core 22, a layer of fibrous insulation 24 surrounding the flexible, cylindrical tubular core; and a vapor barrier jacket 26 enveloping the layer of fibrous insulation 24. The flexible, cylindrical tubular cores 22 of the insulated flexible air ducts 20 are normally between four and twenty inches in diameter with the most common air ducts having core diameters of either six inches or eight inches. The layer of fibrous insulation 24 is typically glass fiber insulation between one and three inches thick.

The cylindrical, tubular core 22 is flexible and formed in a continuous operation. Preferably, the cylindrical tubular core 22 comprises a wire helix 28 with spaced successive convolutions and a plastic core film 30 enveloping and/or bonded to the wire helix. The wire helix 28 can be formed from spring steel or other hard wire materials to provide the insulated flexible air duct 20 with the reinforcement required for its service requirements. The plastic core film 30 is typically made from a two to six inch wide, helically wound, strip of polyester or other polymeric film. While the wire helix can be located on the inside of and bonded to the polymeric core film, typically, the wire helix 28 is located between the overlapping, lateral portions of successive convolutions of the strip of polymeric core film 30 as shown in FIG. 3. The overlapping, lateral portions of successive convolutions of the helically wound strip of polymeric film 30 are typically bonded together with a standard water based adhesive or otherwise bonded together by heat or solvent welding so that the plastic core film 30 will not unravel and the wire helix is held in place. The flexible, cylindrical tubular core 22 is manufactured on conventional commercially available core fabricating equipment and the method of forming the flexible, cylindrical tubular core 22 with the equipment is conventional.

The layer of fibrous insulation 24 comprises a strip 34 of glass fiber blanket or other fibrous insulation material which is helically wrapped about the flexible, cylindrical tubular core 22. As best shown in FIGS. 3, 6 and 7, lateral portions 36 of successive convolutions of the strip 34 of glass fiber insulation overlap. The overlapping lateral portions 36 of the strip of glass fiber insulation can be adhesively bonded together with an adhesive such as, a standard water based adhesive. The adhesive can be sprayed onto the surface of one of the lateral portions 36 or applied as a bead 38 of adhesive such as shown in FIGS. 6 and 7.

The width of the strip 34 of glass fiber insulation blanket is typically between eighteen and forty-eight inches. The strip 34 used should be as wide as practical to minimize the number of helical seams in the layer 24 of fibrous insulation, but not so wide as to impede the easy helical wrapping of the strip of fibrous insulation about the core 22. The degree of overlap of the lateral portions 36 of the strip of fibrous insulation should be such that the insulated flexible air duct 20 can be flexed without having the successive convolutions of the strip 34 of fibrous insulation separate to form an uninsulated radially extending gap completely through the layer 24 of fibrous insulation. By using an adhesive to bond the overlapping portions 36 of the successive convolutions of fibrous insulation together, it is contemplated that the degree of overlap can be reduced without creating a gap in the insulation layer 24 when the insulated flexible air duct 20 is flexed.

Preferably, the lateral portions 36 of the strip 34 of glass fiber insulation should overlap to such an extent that the insulated flexible air duct 20 can be bent through an 180° arc over a mandrel having a diameter equal to the inside diameter of the core 22 of the air duct 20 without forming a radially extending gap completely through the layer of insulation 24.

The vapor barrier jacket 26 preferably comprises a strip 40 of plastic film such as a metalized polyester film, a polyethylene film, or an equivalent polymeric film typically about eighteen to twenty-four inches wide. The strip 40 should be as wide as practical to minimize the number of helical seams in the vapor barrier jacket 26, but not so wide as to impede the easy helical wrapping of the strip 40 about the glass fiber insulation layer 24. As shown in FIG. 1, the strip 40 of plastic film is helically wrapped about the layer 24 of glass fiber insulation. As shown in FIG. 3, lateral portions of successive convolutions of the strip 40 of plastic film, overlap and are adhesively bonded or heat or solvent welded together to form the vapor barrier jacket 26. The vapor barrier jackets 26 of the embodiments shown in FIGS. 6 and 7 are identical to the vapor barrier jacket of FIG. 3.

As shown in FIGS. 6 and 7, a layer 42 of non-woven glass fiber scrim material can be interposed between the layer of insulation 24 and the vapor barrier jacket 26 or between the layer of insulation 24 and the flexible, cylindrical tubular core 22 to provide the insulated flexible air duct 20 with additional strength.

Figure 4:
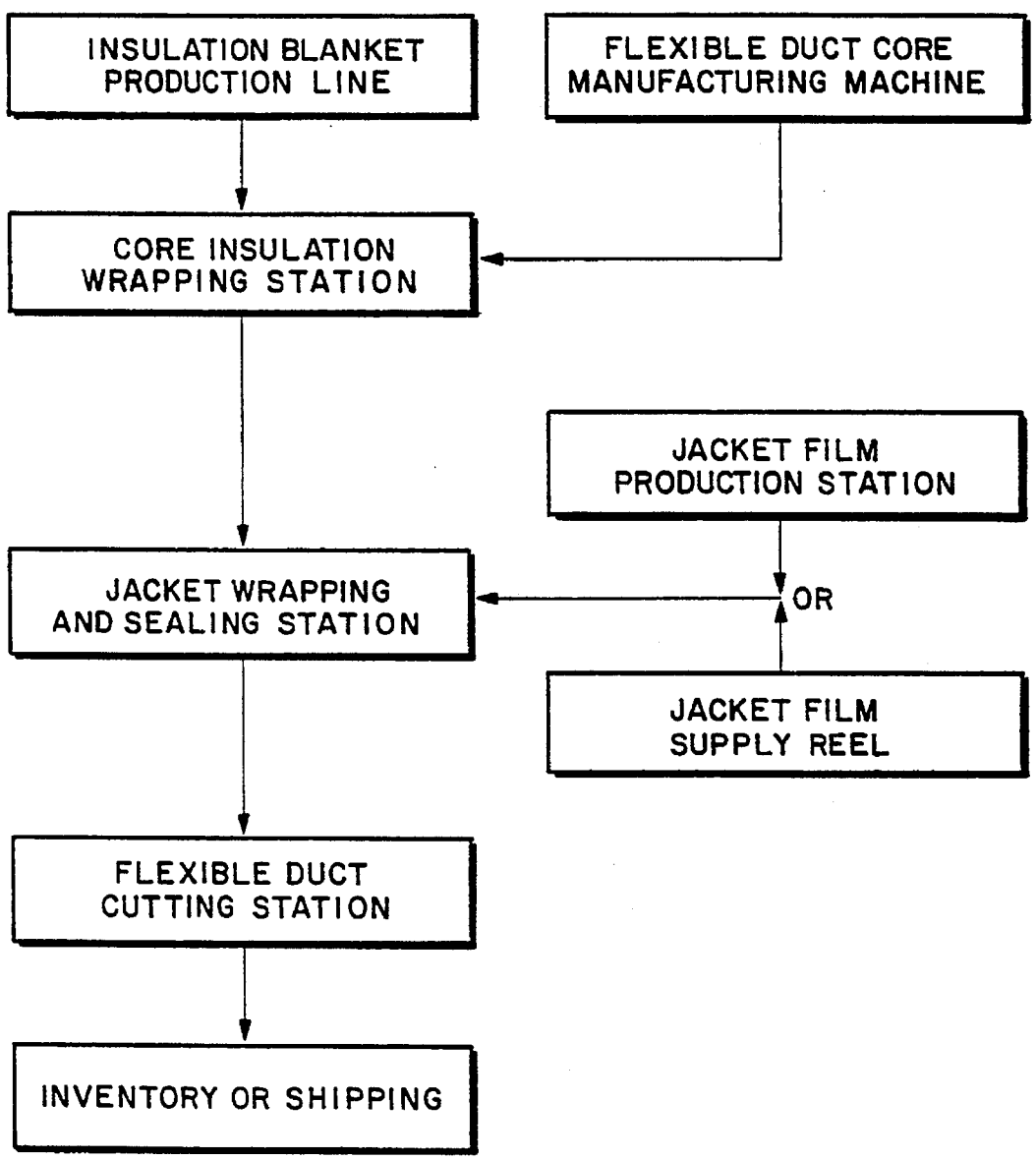
FIG. 4 is a flow diagram setting forth the fabrication steps involved in of the method of the present invention.

The fabrication of the insulated flexible air duct 20 of the present invention is outlined in FIG. 4 and illustrated in FIG.

5. FIG. 5 shows an apparatus 44 for manufacturing the insulated flexible air duct 20. The apparatus 44 comprises a conventional flexible duct core manufacturing machine 46 provided with a rotating cylindrical mandrel 48. As the flexible, cylindrical tubular core 22 is formed in the flexible duct core manufacturing machine 44, the flexible, tubular core 22, still rotating in the direction shown in FIG. 5, is fed axially along the rotating cylindrical mandrel 48 into the core insulation wrapping station. In the core insulation wrapping station, a strip 34 of fibrous insulation blanket from a roll of insulation 50 (FIG. 5) or from a production line (as indicated in FIG. 4) is helically wrapped about the flexible, tubular core 22 to form the layer 24 of fibrous insulation. If the overlapping lateral portions 36 of the fibrous insulation strip 34 are to be bonded together, an adhesive (in bead or spray form) can be applied to the underside of the lateral portion of the strip of fibrous insulation blanket by a conventional adhesive applicator 52.

The insulated tubular core, still rotating in the direction shown in FIG. 5, is fed axially from the core insulation wrapping station to the jacket wrapping and sealing station. In the jacket wrapping and sealing station, the strip 40 of polymeric film from a roll 54 or a film manufacturing apparatus (not shown) has an adhesive or a solvent applied to the lateral portion of the underside of the strip by an adhesive or a solvent applicator 56. The polymeric film strip 40, with the adhesive or solvent applied thereto, is helically wrapped about the layer of fibrous insulation 24 and successive convolutions of the helically wrapped strip are bonded together to form the vapor barrier jacket 26. The overlapping portions of the polymeric film strip 40 can also be heat bonded or otherwise bonded together to form the jacket. The finished insulated flexible air duct is then fed axially into a cutting station (not shown) where the insulated flexible air duct 20 is cut to length for inventory or shipment to the customer.

If a layer of scrim 42 is to be interposed between the core 22 and the layer of insulation 24 as shown in FIG. 7, a scrim wrapping station (not shown) is located intermediate the flexible duct core manufacturing machine 46 and the insulation wrapping station of FIG. 5. If a layer of scrim 42 is to be interposed between the layer of insulation 24 and the vapor barrier jacket 26 as shown in FIG. 6, a scrim wrapping station (not shown) is located intermediate the insulation wrapping station and the jacket film wrapping and sealing station of FIG. 5.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

We claim:

1. A method of manufacturing an insulated, flexible air duct, comprising:

forming a cylindrical wire helix having spaced successive convolutions and a longitudinal axis; rotating said cylindrical wire helix about said longitudinal axis while wrapping a first strip of plastic core film helically about said wire helix with lateral portions of successive convolutions of said first plastic core film overlapping; bonding said overlapping lateral portions of said successive convolutions of said first strip of core film together; and bonding said helically wrapped strip of core film to said wire helix to form a rotating cylindrical flexible duct core;

feeding said cylindrical flexible duct core, as said cylindrical flexible duct core is formed, in an axial direction while continuing to rotate said cylindrical flexible duct core about the longitudinal axis and forming a layer of fibrous insulation about said cylindrical flexible duct core by helically wrapping a strip of fibrous insulation blanket about said cylindrical flexible duct core to form an insulated cylindrical flexible duct core with lateral portions of successive convolutions of said strip of fibrous insulation blanket overlapping to the extent that the insulated, flexible air duct being formed can be bent without forming a radially extending gap, extending completely through said layer of fibrous insulation, between successive convolutions of said strip of fibrous insulation blanket; and feeding said insulated cylindrical flexible duct core in an axial direction while continuing to rotate said insulated cylindrical flexible duct core about the longitudinal axis and forming a vapor barrier jacket about said layer of fibrous insulation by helically wrapping a strip of plastic jacket film about said layer of fibrous insulation with lateral portions of successive convolutions of said strip of plastic jacket film overlapping; and bonding said overlapping lateral portions of said successive convolutions of said strip of plastic jacket film together to form an insulated flexible air duct with a vapor barrier jacket.

2. The method of claim 1, including: bonding together the overlapping lateral portions of said successive convolutions of said strip of fibrous insulation blanket.

3. The method of claim 1, wherein: said lateral portions of said successive convolutions of said strip material are overlapped to the extent that the insulated, flexible air duct can be bent through an 180° arc over a mandrel having a diameter equal to an inside diameter of said flexible cylindrical inner core without forming a gap between said successive convolutions of said strip of fibrous insulation blanket.

4. The method of claim 3, including: bonding together the overlapping lateral portions of said successive convolutions of said strip of fibrous insulation blanket.

5. The method of claim 4, wherein: said strip of fibrous insulation blanket is a glass fiber insulation blanket between about 1 inch and about 3 inches thick.

6. The method of claim 1, wherein: said strip of fibrous insulation blanket is a glass fiber insulation blanket between about 1 inch and about 3 inches thick.

* * * * *